US005513049A

United States Patent [19]
Taylor

[11] Patent Number: 5,513,049
[45] Date of Patent: Apr. 30, 1996

[54] DAY-NIGHT REAR VIEW MIRROR

[75] Inventor: G. Brandt Taylor, Berlin, Mass.

[73] Assignee: Day-Night Mirrors, Inc., Berlin, Mass.

[21] Appl. No.: 371,820

[22] Filed: Jan. 12, 1995

[51] Int. Cl.[6] .............................. G02B 5/26; G02B 26/02; G02B 5/08

[52] U.S. Cl. ........................... 359/884; 359/227; 359/608

[58] Field of Search ................................... 359/227–229, 359/512–514, 601–614, 838–842, 871–874, 878–879, 881–886, 900; 362/135–144, 21, 351

[56] References Cited

U.S. PATENT DOCUMENTS

| | | | |
|---|---|---|---|
| 4,054,374 | 10/1977 | Craig | 359/228 |
| 4,726,656 | 2/1988 | Schofield et al. | 359/603 |
| 4,917,824 | 4/1990 | Lynam et al. | 359/228 |
| 5,028,120 | 7/1991 | Taylor | 359/608 |

Primary Examiner—Thong Q. Nguyen
Attorney, Agent, or Firm—Fish & Richardson

[57] ABSTRACT

A day-night mirror for a vehicle has a first sheet of transparent material, a second sheet adjacent and parallel to the first sheet, the second sheet having a first light reflective surface facing the first sheet. The first and second sheets are joined along a predetermined peripheral region by a first wall of resilient material, and a second wall of flexible material joins the first and second sheets along opposed edge regions. The sheets and walls define a chamber containing a predetermined volume of translucent liquid. A third sheet is positioned within the chamber to move between an active position, with the third sheet between the first and second sheets, and an inactive position, with the third sheet removed from between the first and second sheets. The third sheet, in active position, has a second light reflective surface facing the first sheet, the second light reflective surface differing in light reflectivity from the first light reflective surface. An actuator moves the third sheet between active and inactive positions.

17 Claims, 6 Drawing Sheets

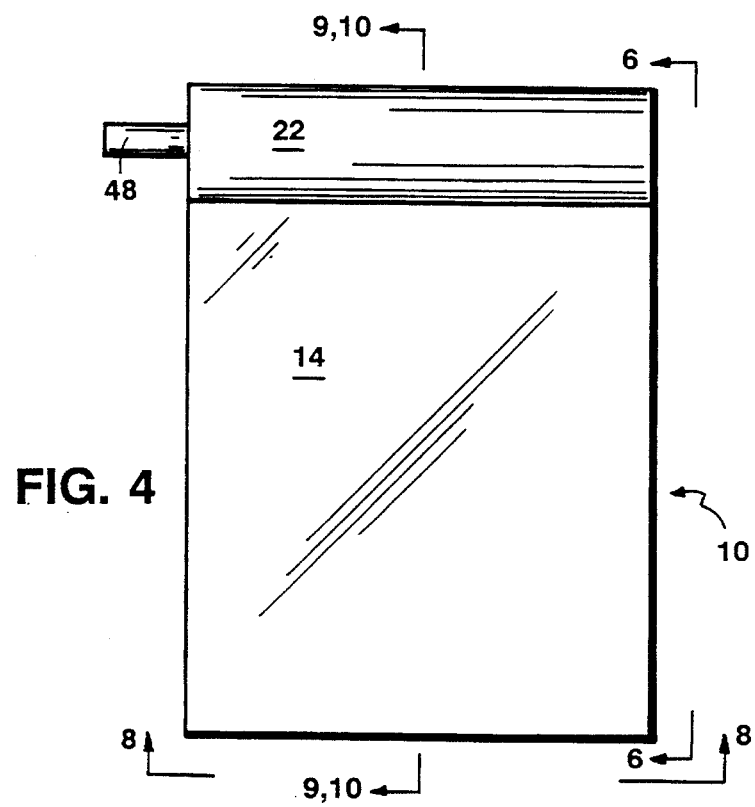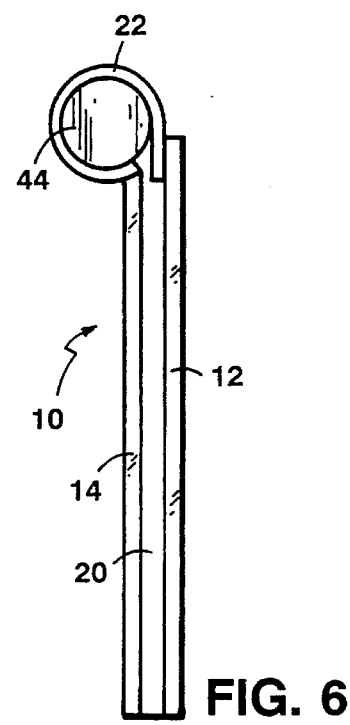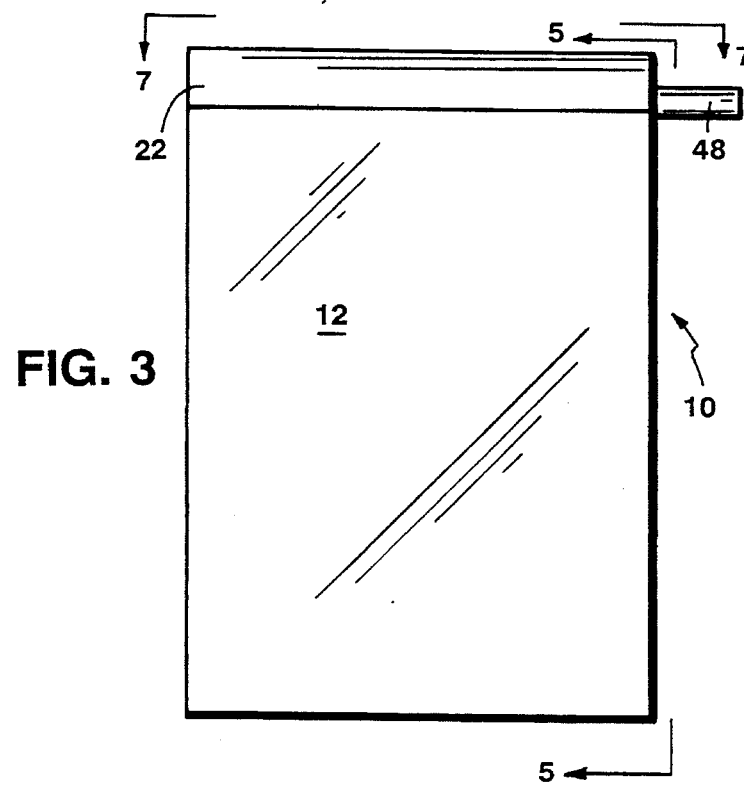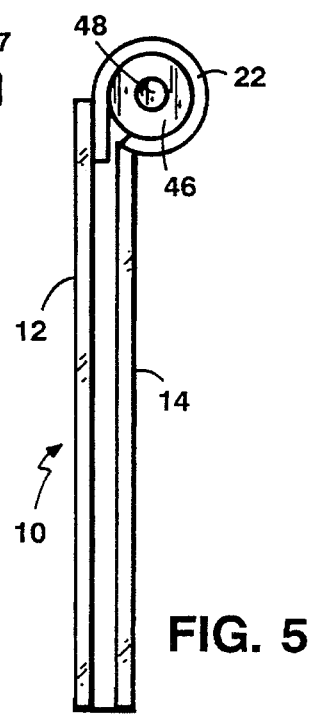

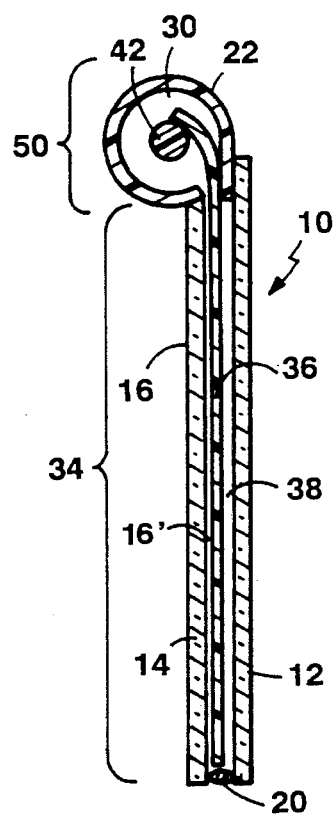
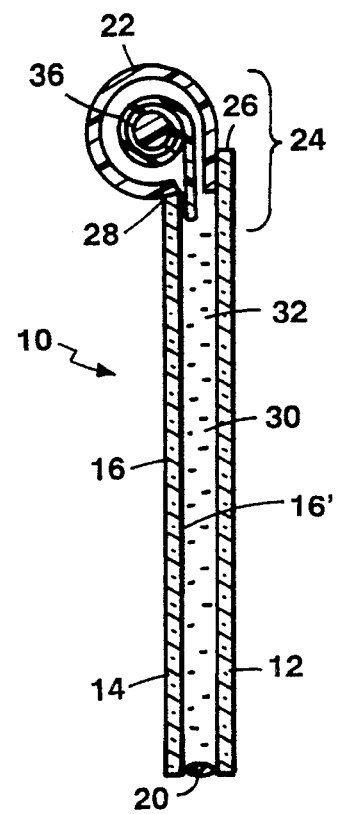
FIG. 9A  FIG. 9B
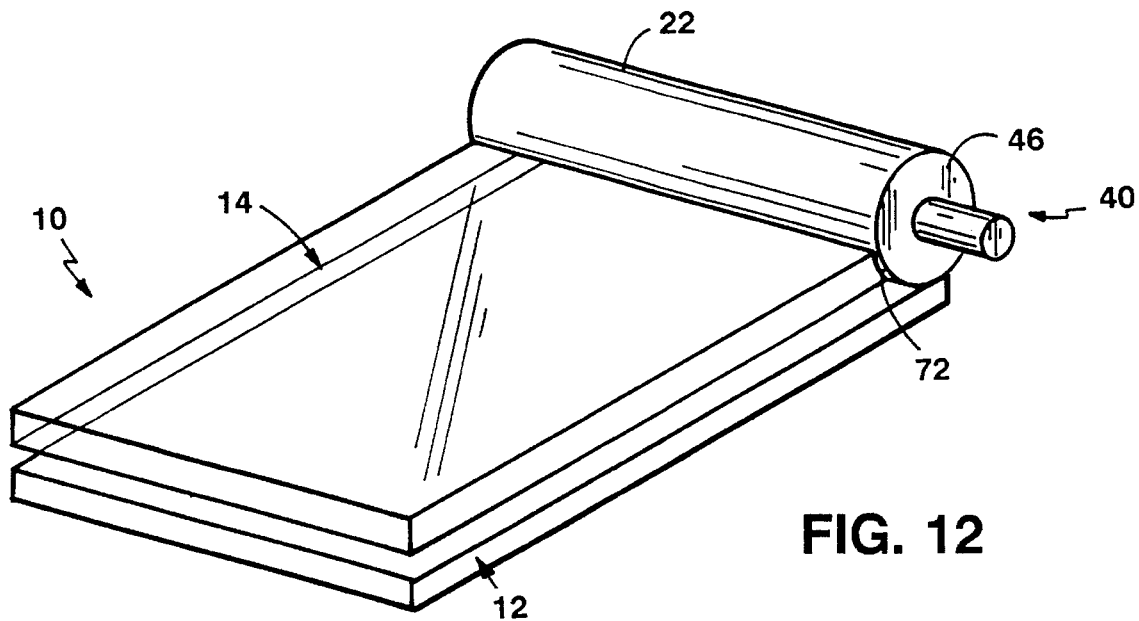
FIG. 12

DAY-NIGHT REAR VIEW MIRROR

The invention relates to day-night rear view mirrors, e.g. for use in motor vehicles.

BACKGROUND OF THE INVENTION

Day-night rear view mirrors are well known for use in motor vehicles to allow an operator to selectively adjust the reflectivity of the mirror between high light conditions and low light conditions, e.g. to reduce the reflected headlight glare from following vehicles.

Typically, the mirror assembly is adjustable by the operator to select between a highly light-reflective surface for use during periods of daylight and a relatively low reflective surface for use during periods of low light, e.g. at night. The relatively low reflectivity minimizes glare perceived by the eyes of a vehicle operator from headlights of a following vehicle, which can be bothersome and also create an unsafe driving condition.

Many mirror assembly designs have been utilized to produce the day-night mirror effect. One such day-night rear view mirror is described in my U.S. Pat. No. 5,028,120, issued Jul. 21, 1991, entitled "Day-Night Rear View Mirror", the disclosure of which is incorporated herein by reference.

Another prior art design used extensively has a mirror with a triangular cross-section for producing two different images. Since about five percent of light rays normal to a glass surface are reflected, the image produced by that surface has a character appropriate for use as a rear view mirror in low light conditions. The remaining ninety-five percent of light rays pass through the surface of the glass to be reflected by the silvered backing of the mirror. Since the mirror has a triangular cross-section, rays of the image produced by the front surface of the glass diverge from rays of the image produced by the silvered back of the glass. By the same token, images from two different points or sources of light converge to a single point, i.e. at the motor vehicle operator. When the mirror assembly is mounted, e.g. in an automobile, the roof of the vehicle is the point source for one image. Since there is no light source in the roof of the vehicle, only one image is visible to the operator. Therefore, by adjusting the position or tilt of the mirror, the operator can selectively view either an image from light reflected from the glass surface, or an image produced by light passing through the glass surface to be reflected by the silvered back of the glass.

Unfortunately, a mirror assembly utilizing a movable triangular mirror or prism is limited to use within a vehicle. If used on the exterior of a vehicle, e.g. a truck or motorcycle, or in a convertible with the top down, two images are visible to the operator simultaneously. For example, as the operator drives down a street lit by street lights with cars following behind, the street light images are viewed by the operator as overlapping the image(s) of car headlights behind the operator.

Others have sought to address this problem with a day-night rear view mirror having a transparent glass panel positioned within a housing between a mirror and an area to be viewed. The mirror is surrounded by a movable opaque shade with a window that is brought into and out of registration with the light reflective surface of the mirror. For example, for night viewing, the window is placed out of registration, with the mirror covered by the opaque shade material, so that images such as headlights of following vehicles are reflected by the plain glass panel in front of the mirror. Since the light reflectivity of the plain glass panel is much lower than the light reflectivity of the mirror, the reflected image viewed by the vehicle operator has greatly diminished intensity, i.e. glare. For daylight use, the window is placed in registration with the mirror so that images from the rear of the vehicle pass through the transparent glass panel to be reflected by the mirror. This day-night rear view mirror designed for mounting outside a vehicle has also often been found less than satisfactory in actual use. For example, during daytime viewing, the operator can perceive a faint, second image offset from the principle image reflected by the mirror. This is an annoying condition that can distract the operator.

SUMMARY OF THE INVENTION

According to one aspect of the invention, a day-night mirror assembly for a vehicle comprises a first sheet of transparent material; a second sheet disposed adjacent and parallel to the first sheet, the second sheet having a first light reflective surface facing the first sheet; the first sheet and the second sheet joined along a predetermined peripheral region by a first wall of resilient material; a second wall of flexible material joining the first sheet and the second sheet along opposed edge regions of the first and second sheets; the first sheet, the second sheet, the resilient first wall and the flexible second wall defining a chamber; a predetermined volume of translucent liquid disposed within the chamber to occupy, in use, at least a viewing region between the first sheet and the second sheet; a third sheet positioned within the chamber and disposed for movement between an active position, in which the third sheet is located generally between the first sheet and the second sheet, and an inactive position, in which the third sheet is removed from between the first sheet and the second sheet, the third sheet having a second light reflective surface facing the first sheet when the third sheet is in the active position, the second light reflective surface differing in light reflectivity from the first light reflective surface; and an actuator for selective movement of the third sheet between the active position and the inactive position.

Preferred embodiments of this aspect of the invention may include one or more of the following additional features. The actuator comprises a roller disposed within the chamber with the third sheet attached thereto, the roller being mounted for rotation between a first roller position with the third sheet wrapped about the roller, in the inactive position, and a second roller position with the third sheet extended from the roller, in the active position. Preferably, the actuator further comprises a first end cap and a second end cap, the roller being mounted therebetween, with the first and second end caps disposed in engagement with the flexible second wall and further defining the chamber. More preferably, the first end cap defines a bore, and the actuator further comprises an actuator shaft connected to the roller and extending through the bore. The translucent liquid disposed within the chamber comprises silicone fluid or synthetic oil having low viscosity at low service temperature, e.g. at least below 200 centistoke, and preferably below about 50 centistoke at −40° C. The flexible second wall is formed of polytetrafluoroethylene (PTFE), e.g. having a thickness of about 0.010 inch. The predetermined volume of the translucent liquid is selected to fill the chamber to the exclusion of substantially all gas under predetermined conditions of temperature and pressure. A volume defined by the chamber changes with changes in the predetermined volume of translucent liquid in response to conditions of temperature and pressure by flexing of the second wall. The first light reflective surface has higher light reflectivity than the second light reflective surface.

According to another aspect of the invention, a motorcycle comprising a frame, at least two wheels, a motor, and a seat for an operator also has a mirror assembly positioned to allow the operator to view to the rear while facing in a direction of travel, the mirror assembly comprising: a first sheet of transparent material; a second sheet disposed adjacent and generally parallel to the first sheet, the second sheet having a first light reflective surface facing the first sheet; the first sheet and the second sheet joined along a predetermined peripheral region by a first wall of resilient material; a second wall of flexible material joining the first sheet and the second sheet along opposed edge regions of the first sheet and the second sheet; the first sheet, the second sheet, the resilient first wall and the flexible second wall defining a chamber; a predetermined volume of translucent liquid disposed within the chamber to occupy, during use, at least a viewing region between the first sheet and the second sheet; a third sheet positioned within the chamber and disposed for movement between an active position, in which the third sheet is located generally between the first sheet and the second sheet, and an inactive position, in which the third sheet is removed from between the first sheet and the second sheet, the third sheet having a second light reflective surface facing the first sheet when the third sheet is in the active position, the second light reflective surface differing in light reflectivity from the first light reflective surface; and an actuator for selective movement of the third sheet between the active position and the inactive position.

According to yet another aspect of the invention, a method for assembling a day-night mirror assembly for a vehicle comprises the steps of: providing a first sheet of transparent material, a second sheet of material having a first light reflective surface, and a sheet of flexible material; joining a first edge region of the first sheet of transparent material to a first edge region of the sheet of flexible material; joining a first edge region of the second sheet of material to a second edge region of the sheet of flexible material opposite the first edge region of the sheet of flexible material; positioning the first sheet adjacent and generally parallel to the second sheet, with the first light reflective surface of the second sheet facing the first sheet, the sheet of flexible material forming a flexible end wall; providing a third sheet having a second light reflective surface differing in light reflectivity from the first light reflective surface; positioning the third sheet within a chamber defined in part by the first sheet, the second sheet, and the flexible end wall, for movement between an active position, in which the third sheet is located generally between the first sheet and the second sheet, with the second light reflective surface facing the first sheet, and an inactive position, in which the third sheet is removed from between the first sheet and the second sheet; joining the first sheet and the second sheet together along a predetermined peripheral region with a side wall of resilient material to form a resilient wall, the side wall further defining the chamber; placing the chamber under vacuum; introducing a predetermined volume of translucent liquid into the chamber, the predetermined volume selected to occupy at least a region between the first sheet and the second sheet; sealing the chamber; and allowing the flexible end wall to flex inwardly relative to the chamber to compensate for contraction and expansion of the translucent liquid with temperature.

Preferred embodiments of this aspect of the invention may include one or more of the following additional features. The step of joining the first sheet and the second sheet together along a predetermined peripheral region with a first wall of resilient material comprises placing a bead of adhesive along a peripheral region of at least one opposed surface of the first sheet and the second sheet. The preferred embodiment of the method comprises the further step of providing an actuator for selective movement of the third sheet between the active position and the inactive position. The preferred embodiment of the method comprises the further step of placing the actuator within the chamber in a region within the end wall, prior to the step of joining the first sheet and the second sheet together.

Objectives of the invention include providing a day-night rear view mirror assembly that may be selectively actuated to provide an attenuated image for nighttime viewing and a clear, bright image during daytime viewing without any annoying double image, including when mounted on a motorcycle or upon the outside of a truck or other vehicle. Other objectives include providing a day-night rear view mirror with both a bright, daytime image and an attenuated nighttime image that are clearer than those of prior art rear view mirrors, without a double image. Still further objectives of this invention include providing a day-night rear view mirror that is: considerably simpler in construction than previous day-night mirrors, significantly less subject to developing bubbles of air or other gas that may obstruct the viewing region, more friendly to the environment, and easier to use.

These and other features and advantages of the present invention will be apparent from the following description of a presently preferred embodiment, and from the claims.

BRIEF DESCRIPTION OF THE DRAWING

FIGS. 3 is a front view of the improved day-night rear view mirror of FIG. 2;

FIG. 4 is a rear view of the improved day-night rear view mirror of FIG. 2;

FIG. 5 is a first side view of the improved day-night rear view mirror of FIG. 2, taken at the line 5—5 of FIG. 3;

FIG. 6 is a second side view of the improved day-night rear view mirror of FIG. 2, taken at the line 6—6 of FIG. 4;

FIG. 9A is a side section view of the improved day-night rear view mirror of FIG. 2, taken along the line 9—9 of FIG. 4, with the inner sheet in active position for night use; and FIG. 9B is a similar side section view of the improved day-night rear view mirror of FIG. 2, also taken along the line 9—9 of FIG. 4, with in the inner sheet in inactive position for daylight use.

FIG. 12 is a similar diagrammatic view of an assembled improved day-night rear view mirror of the invention.

DESCRIPTION OF THE PREFERRED EMBODIMENTS

Figure 1:
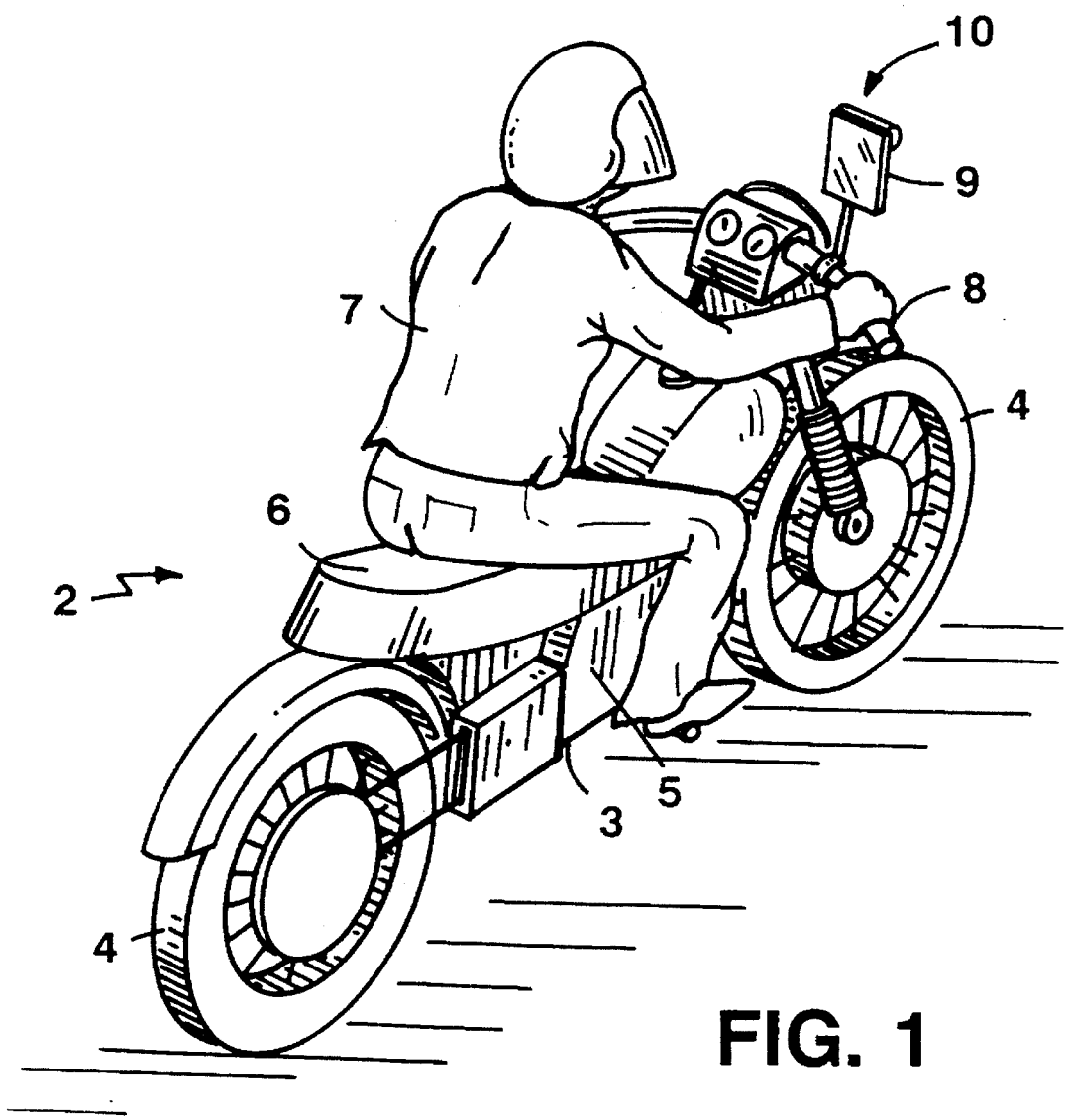
FIG. 1 is a perspective view of a motor vehicle equipped with an improved day-night rear view mirror assembly of the invention in a frame.
Figure 2:
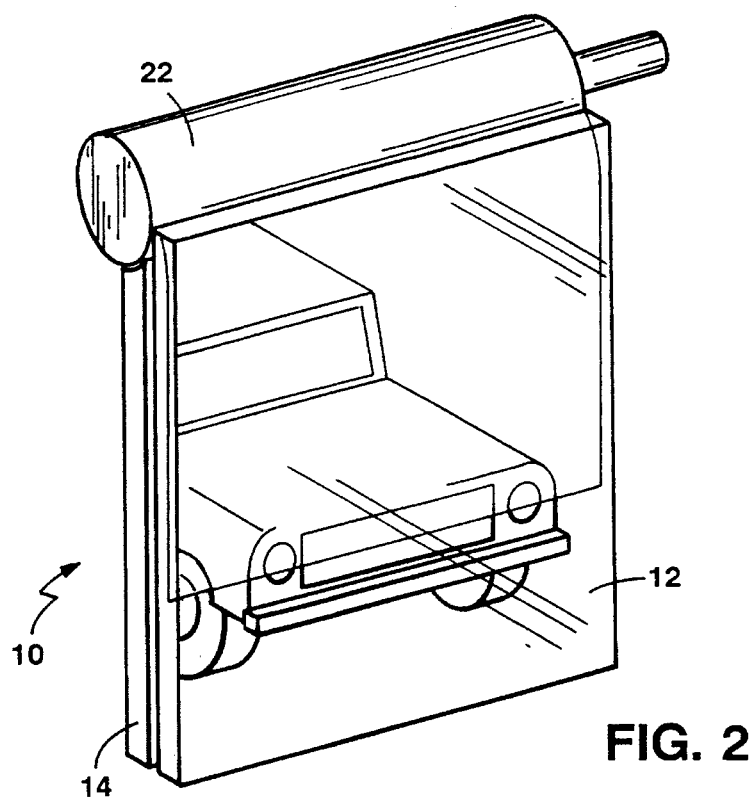
FIG. 2 is a perspective view of an improved day-night rear view mirror of the invention.
Figure 7:
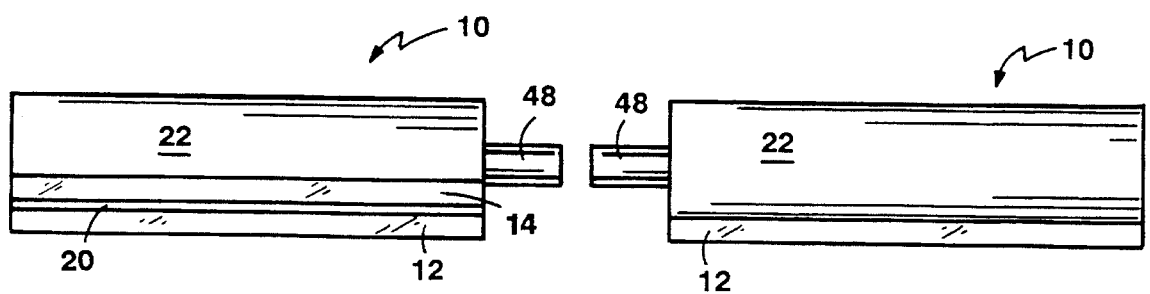
FIG. 7 is a top plan view of the improved day-night rear view mirror of FIG. 2, taken at the line 7—7 of FIG. 3.
Figure 8:
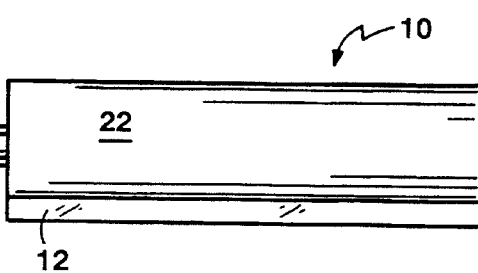
FIG. 8 is a bottom plan view of the improved day-night rear view mirror of FIG. 2, taken at the line 8—8 of FIG. 4.

Referring to FIG. 1, a motor vehicle, e.g. a motorcycle 2, consisting of a frame 3, at least two wheels 4, a motor 5 and a seat 6 for an operator 7, is equipped with an improved rear view mirror assembly 10 of the invention, mounted on the handlebars 8, within a protective frame or housing 9.

Referring also to FIG. 12, the improved day-night rear view mirror assembly 10 consists of a first sheet of transparent material 12, e.g. glass or suitable plastic, and a second sheet 14, e.g. also glass or a suitable plastic, disposed adjacent and generally parallel to the first sheet, the second sheet having a first light reflective surface 16 facing the first sheet 12. In preferred embodiments, the second sheet 14 is a conventional glass mirror having a highly light-reflective surface 16.

Figure 11:
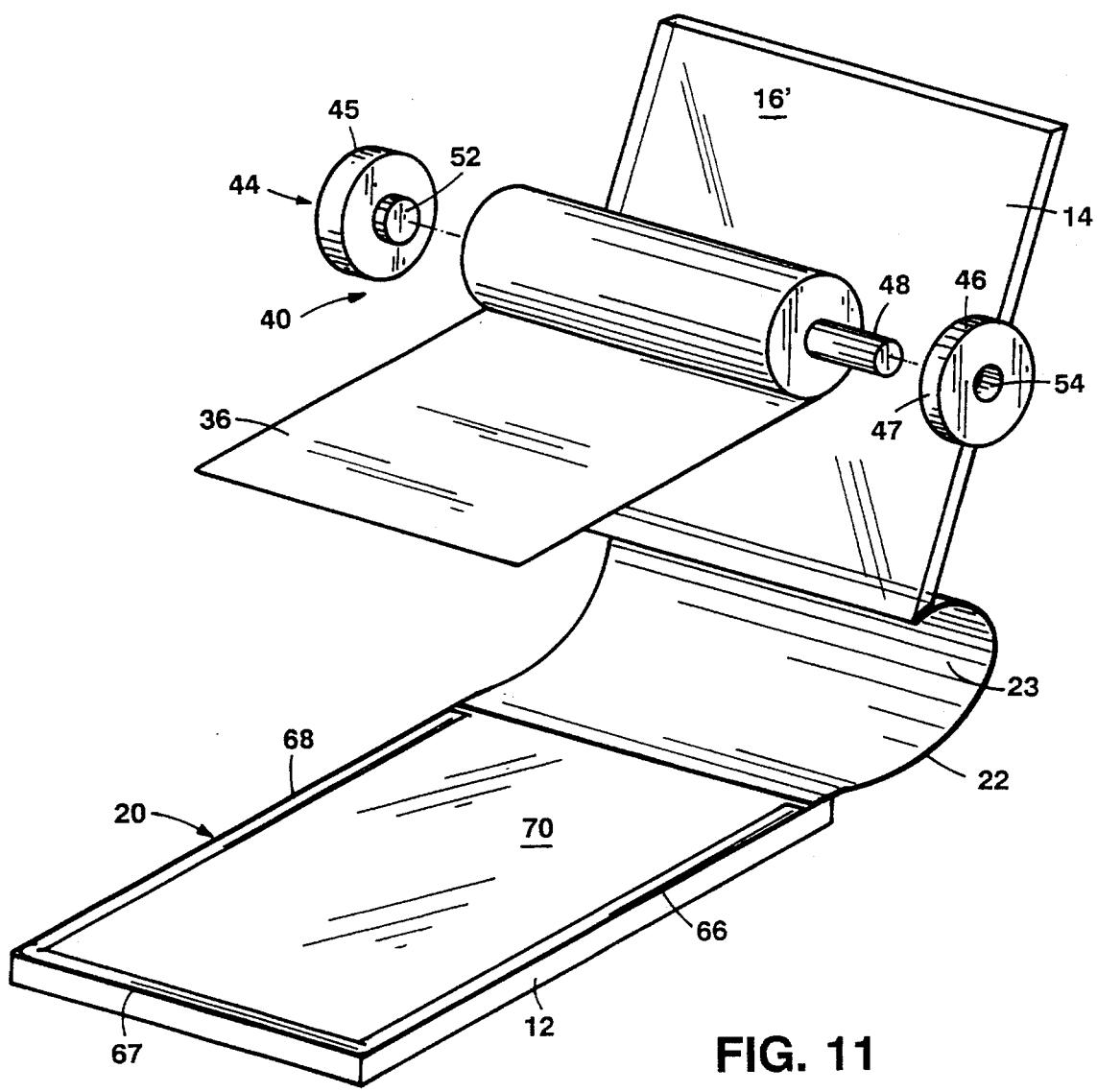
FIG. 11 is a similar diagrammatic exploded view of a second step of assembling an improved day-night rear view mirror of the invention.

The first sheet 12 and the second sheet 14 are joined in a predetermined peripheral region by a first wall 20 of a suitable resilient adhesive material (e.g., fluorosilicone RTV, methacrylate adhesive (thixotropic) or polyurethane adhesive (thixotropic)) extending between the opposed surfaces of sheets 12, 14, generally along three edges (See FIG. 11). As shown particularly in FIGS. 9A and 9B, a second wall 22 of flexible material joins the first sheet 12 and the second sheet 14 in a region 24 of opposed edges 26, 28 of the first and second sheets, respectively, as described more fully below. The first sheet 12, the second sheet 14, the first wall 20 and the second wall 22 together define a chamber 30.

A predetermined volume of a suitable translucent liquid 32 that retains a relatively low viscosity, e.g. at least below 200 centistoke, even at low service temperature, is disposed within the chamber to occupy at least a region 34 between the first and second sheets 12, 14, substantially without any air trapped therewithin. Suitable liquids include synthetic oil and silicone fluid; in particular, linear polymethylsiloxane polymer having a viscosity of 5 centistoke at 20° C. and a viscosity of 30 centistoke at − 40° C. The liquid also provides lubrication for moving parts to enhance operation and extend useful life.

A third sheet 36 of bendable and resilient material, e.g. polytetrafluoroethylene (PTFE) having a thickness of about 0.005 inch, is positioned within the chamber 30 and disposed for movement between an active position (FIG. 9A) in which the third sheet 36 is located generally between the first sheet 12 and the second sheet 14, and an inactive position (FIG. 9B), in which the third sheet 36 is removed from between the first sheet and the second sheet. The third sheet 36 has a second light reflective surface 38 facing the first sheet 12 when the third sheet is in its active position. Preferably, the first light reflective surface 16 of sheet 14 has higher light reflectivity than the second light reflective surface 38 of sheet 36.

The presence of the translucent liquid 32 within the chamber 30, without entrapped air or other gas, enhances the clarity of both the daytime image, produced by the first light reflective surface 16, and the nighttime image, produced by the second light reflective surface 38. The substitution of the translucent liquid 32, suitably matched to the refractive indices of the first and second sheets, for air or other gas in the viewing region 34 of the chamber 30 reduces or eliminates the formation of a double image in both the nighttime mode and the daytime mode. Use of translucent liquid 32 that retains a low viscosity at low temperatures also avoids resistance to movement of the third sheet 32, even in severe temperature conditions. For example, in the preferred embodiment, by use of linear polymethylsiloxane polymer having relatively low viscosity even at extreme low service temperature, the flexible third sheet 36 can be extended into the active position within the chamber, uncoiling from region 30 by movement of the lead edge along the inner surface of the flexible second wall 32, even when region 30 has a desirably small diameter, e.g. less than about 2 inches, and preferably no more than about 0.5 to 0.75 inch.

Referring to FIGS 11 and 12, an actuator 40 is provided for selective movement of the third sheet 36 between its active position and its inactive position. The actuator consists of a roller 42 disposed within a upper, cylindrical region 50 (FIG. 9A) of the chamber 30, with the third sheet 36 attached thereto. End caps 44, 46 at each end of the roller 42 have rim surfaces 45, 47, respectively, in sealed engagement with the inner surface 23 of the flexible wall 22. End cap 44 defines an axial stud 52 engaged in a corresponding axial bore of roller 42, and end cap 46 defines an axial bore 54 sized to receive an actuator knob 48 of roller 42 therethrough in sealing relationship.

In operation, the sheet 36 is moved between its active position, disposed in the lower region 34 of chamber 30, between sheets 12, 14 (FIG. 9A), and its inactive position, withdrawn into the upper, generally cylindrical region 50 of chamber 30, and wrapped about roller 42 (FIG. 9B), by rotation of knob 48.

Figure 10:
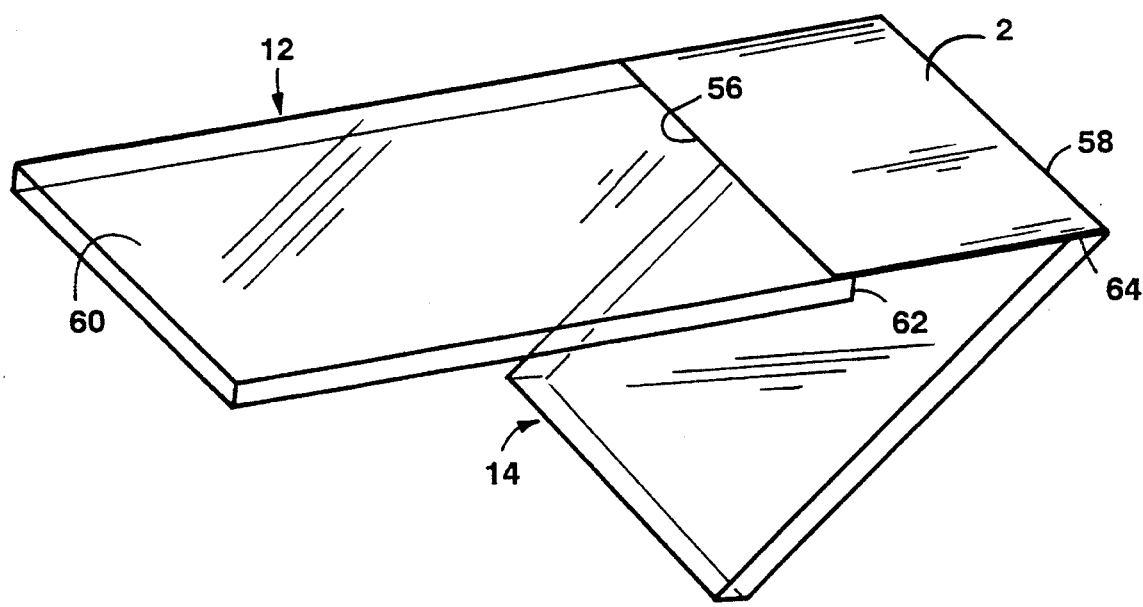
FIG. 10 is a somewhat diagrammatic view of a first step of assembling an improved day-night rear view mirror of the invention.

Referring in particular to FIGS. 10–12, a method for assembling a day-night vehicle mirror assembly of the invention 10 includes the step of providing: a first transparent sheet 12, e.g. glass; a second sheet 14 of material having a first light reflective surface 16, e.g. a glass sheet with a mirror surface; a third sheet 36 of bendable and resilient material have a second light reflective surface 38 differing in light reflectivity from the first light reflective surface, e.g. polytetrafluoroethylene (PTFE) having a thickness of about 0.005 inch; an actuator 40 attached at an edge of the third sheet 36; and a sheet 22 of flexible material, e.g. also PTFE about 0.010 inch thick.

End regions of the sheet 22 of flexible material, adjacent opposite edges 56, 58 of one face of the sheet, are fixedly joined, e.g. with a suitable adhesive, to an end region of a first surface 60 of the glass sheet 12 adjacent to a first edge 62 (26 in FIG. 9B) and to a corresponding first end surface 64 of the mirror sheet 14, the first end surface 64 (28 in FIG. 9B) of the mirror having a bevel or slightly concave shape to conform for better sealing with the rim surfaces 45, 47 of the end caps 44, 46 in the final assembly, as described below.

Referring now to FIG. 11, to assemble the rear view vehicle mirror 10 of the invention, the glass sheet 12 is positioned with the first surface 60 exposed. A continuous bead 20 of the suitable resilient adhesive material is applied to the first surface along the remaining edges 66, 67, 68. The actuator roller 42 is positioned to be enclosed by the inner surface 23 of the sheet 22 of flexible material, with the attached third sheet 36 extending upon the center region 70 of the glass sheet 12 (within the continuous bead 20 of adhesive), as the mirror sheet 14 is next moved to a position adjacent and generally parallel to the glass sheet 12, with the respective first edges 62, 64 in registration and the first light reflective surface 16 of the mirror sheet 14 facing the glass sheet 12. The length of the sheet 22 of flexible material (now forming an end wall) is predetermined to bring the inner surface 23 into close engagement about the rim surfaces 45, 47 of the end caps 44, 46, which also conform to the bevel or concave surface 64 of the mirror sheet 14. The end wall can then be sealed, e.g. with adhesive, the rim surfaces 45, 47 of the end caps.

A predetermined volume of translucent liquid 32 is introduced into the chamber 30, having a first segment 34 formed between the opposed surfaces 16', 60 of the mirror and glass sheets 12, 14 and a second segment 50 within the cylindrical volume defined by the end wall 22 and the end caps 44, 46.

The volume of liquid 32 introduced into the chamber 30 during assembly is selected to be that required to fill the chamber when the assembly 10 is at the upper service range temperature.

The assembly is placed in a vacuum to remove all air and other gas from the chamber; then, the chamber vent 72 is sealed. The flexible material 22 of the cylindrical end wall can then deform as the liquid 32 within the chamber 30 expands and contracts to compensate for the changes in volumes with temperature, without disadvantageous changes in internal pressure.

As a result of this construction, the improved day/night rear view mirror 10 of the invention compensates for the fact that different materials have thermal expansion coefficients that are different, e.g. from those of glass, and reduces or eliminates the mechanical stresses that were present in prior art devices with deviation of ambient temperature from the temperature of assembly. In the rear view mirror of the invention, the surfaces of the glass and mirror sheets 12, 14 remain parallel to each other, avoiding secondary reflections or distortions, e.g. as can occur in a mirror having a rigid housing.

Also, in the rear view mirror of the invention, the flexible end wall 22 of the fluid-filled chamber 30 compensates for differences between the thermal expansion coefficient of the liquid 32 as compared to that of its surroundings, e.g. the glass and mirror sheets 12, 14 or roller 42. This construction also avoids introducing of stresses into the device. These combined stresses, when concentrated by imperfections in the glass or mirror surfaces, can lead to crack initiation and/or propagation and, ultimately, can lead to failure of the mirror. Absent the flexible end wall 22 of the present invention, a change of volume of the liquid 32 within the chamber 30 with temperature would cause a pressure differential between the inside and outside of the device, which in turn would tax the seal system and create a tendency for air to leak into the chamber and/or for liquid to leak out of the chamber, both conditions avoided in the present invention.

In the present invention, the flexible plastic film 22 of the end wall compensates fully for differences in thermal expansion, e.g. between the glass and mirror sheets 12, 14 and the flexible wall 22, and for changes in pressure/volume within the chamber. As a result, the plastic film is strained, not the glass and mirror sheets. Furthermore, the glass and mirror sheets remain parallel to each other, without cracking due to thermal distortions.

Other embodiments are within the following claims. For example, the second, flexible wall region of the chamber may be located at either side, or below, the viewing region 34 of the mirror.

Also, the second wall 22 and the third sheet 36, both of PTFE, may be etched in selected edge regions to improve adhesion.

Also, by minimizing the thickness of the third sheet and also the clearance between the third sheet and the opposed surfaces of the chamber, the volume of liquid required in the chamber can be reduced, thereby minimizing the differential volume of thermal expansion of the translucent liquid between high service temperatures and low surface temperatures to a degree sufficient to allow it to be accommodated by a second wall of less flexible material, or, where entire assembly is suitably constructed, with a second wall of relatively stiff material capable of withstanding the increased strain. Suitable materials include first and second sheets of relatively thick soda-lime glass, e.g. 0.90 inch, and a second wall of relatively thin 430 stainless steel, e.g. 0.024 inch.

Finally, during construction, the temperature of assembly, e.g. while under vacuum, may be increased to about the upper service range temperature to expand the liquid 32 to fill the chamber 30, thereby forcing any residual air or other gas out of the chamber through the vent. Then, while maintaining the assembly at the upper service range temperature, the vent 72 may be closed.

What is claimed is:

1. A day-night mirror assembly for a vehicle, said mirror assembly comprising:

a first sheet of transparent material;

a second sheet disposed adjacent and generally parallel to said first sheet, said second sheet having a first light reflective surface facing said first sheet;

said first sheet and said second sheet joined along a predetermined peripheral region by a first wall of resilient material;

a second wall of flexible material joining said first sheet and said second sheet along opposed edge regions of said first sheet and said second sheet;

said first sheet, said second sheet, said first wall and said second wall defining a chamber;

a predetermined volume of translucent liquid disposed within said chamber to occupy, in use, at least a region between said first sheet and said second sheet;

a third sheet positioned within said chamber and disposed for movement between an active position, in which said third sheet is located generally between said first sheet and said second sheet, and an inactive position, in which said third sheet is removed from between said first sheet and said second sheet, said third sheet having a second light reflective surface facing said first sheet when said third sheet is in said active position, said second light reflective surface differing in light reflectivity from said first light reflective surface; and an actuator for selective movement of said third sheet between said active position and said inactive position.

2. The day-night mirror assembly of claim 1, wherein said actuator comprises a roller disposed within said chamber with said third sheet attached thereto, said roller being mounted for rotation between a first roller position with said third sheet wrapped about said roller, in said inactive position, and a second roller position with said third sheet extended from said roller, in said active position.

3. The day-night mirror assembly of claim 2, wherein said actuator further comprises a first end cap and a second end cap, said roller being mounted therebetween, with said first end cap and said second end cap disposed in engagement with said second wall and further defining said chamber.

4. The day-night mirror assembly of claim 3, wherein said first end cap defines a bore, and said actuator further comprises an actuator shaft connected to said roller and extending through said bore.

5. The day-night mirror assembly of claim 1, wherein said translucent liquid disposed within said chamber comprises silicone fluid having a viscosity of less than about 200 centistoke at a low service temperature of about − 40° C.

6. The day-night mirror assembly of claim 5, wherein said silicone fluid comprises linear polymethylsiloxane polymer having a viscosity of 30 centistoke at −40° C.

7. The day-night mirror assembly of claim 1, wherein said translucent liquid disposed within said chamber comprises synthetic oil having a viscosity of less than about 200 centistoke at a low service temperature of about − 40° C.

8. The day-night mirror assembly of claim 1, wherein said second wall of flexible material is formed of polytetrafluoroethylene (PTFE).

9. The day-night mirror assembly of claim 8, wherein said second wall of flexible material has a thickness of about 0.010 inch.

10. The day-night mirror assembly of claim 1, wherein said predetermined volume of said translucent liquid is selected to fill said chamber to the exclusion of substantially all gas.

11. The day-night mirror assembly of claim 1, wherein a volume defined by said chamber changes with changes in said predetermined volume of said translucent liquid in response to conditions of temperature and pressure by flexing of said second wall.

12. The day-night mirror of claim 1 wherein said first light reflective surface has higher light reflectivity than said second light reflective surface.

13. A motorcycle comprising a frame, at least two wheels, a motor, a seat for an operator and a mirror assembly positioned to allow the operator to view to the rear while facing in a direction of travel, said mirror assembly comprising:

a first sheet of transparent material;

a second sheet disposed adjacent and generally parallel to said first sheet, said second sheet having a first light reflective surface facing said first sheet;

said first sheet and said second sheet joined along a predetermined peripheral region by a first wall of resilient material;

a second wall of flexible material joining said first sheet and said second sheet along opposed edge regions of said first sheet and said second sheet;

said first sheet, said second sheet, said first wall and said second wall defining a chamber;

a predetermined volume of translucent liquid disposed within said chamber to occupy, during use, at least a region between said first sheet and said second sheet;

a third sheet positioned within said chamber and disposed for movement between an active position, in which said third sheet is located generally between said first sheet and said second sheet, and an inactive position, in which said third sheet is removed from between said first sheet and said second sheet, said third sheet having a second light reflective surface facing said first sheet when said third sheet is in said active position, said second light reflective surface differing in light reflectivity from said first light reflective surface; and an actuator for selective movement of said third sheet between said active position and said inactive position.

14. A method for assembling a day-night mirror assembly for a vehicle comprises the steps of:

providing a first sheet of transparent material, a second sheet of material having a first light reflective surface, and a sheet of flexible material;

joining a first edge region of said first sheet of transparent material to a first edge region of said sheet of flexible material;

joining a first edge region of said second sheet of material to a second edge region of said sheet of flexible material opposite said first edge region of said sheet of flexible material;

positioning said first sheet adjacent and generally parallel to said second sheet, with said first light reflective surface of said second sheet facing said first sheet, said sheet of flexible material forming a flexible end wall;

providing a third sheet having a second light reflective surface differing in light reflectivity from said first light reflective surface;

positioning said third sheet within a chamber defined in part by said first sheet, said second sheet, and said end wall, for movement between an active position, in which said third sheet is located generally between said first sheet and said second sheet, with the second light reflective surface facing said first sheet, and an inactive position, in which said third sheet is removed from between said first sheet and said second sheet;

joining said first sheet and said second sheet together along a predetermined peripheral region with a side wall of resilient material, said side wall further defining said chamber;

placing said chamber under vacuum;

introducing a predetermined volume of translucent liquid into said chamber, said predetermined volume selected to occupy at least a region between said first sheet and said second sheet;

sealing the chamber; and allowing the flexible end wall to flex inwardly relative to the chamber to compensate for contraction and expansion of the translucent liquid with temperature.

15. The method of claim 14 wherein said step of joining said first sheet and said second sheet together along a predetermined peripheral region with a side wall of resilient material comprises placing a bead of adhesive along a peripheral region of opposed surfaces of said first sheet and said second sheet.

16. The method of claim 14 comprising the further step of providing an actuator for selective movement of said third sheet between said active position and said inactive position.

17. The method of claim 16 comprising the further step of placing said actuator within said chamber in a region within said end wall, prior to the step of joining said first sheet and said second sheet together.

* * * * *

UNITED STATES PATENT AND TRADEMARK OFFICE
CERTIFICATE OF CORRECTION

PATENT NO.   : 5,513,049
DATED        : April 30, 1996
INVENTOR(S)  : G. Brandt Taylor It is certified that error appears in the above-identified patent and that said Letters Patent is hereby corrected as shown below:

Title page, item [21],
Appl. Serial No. "371,820", should be --371,826--.

Col. 4, line 60, delete first occurrance of "in".

Col. 5, line 12, delete "FIG. 12" and insert --Figs. 2-12--.

Col. 6, line 1, insert --surface-- before "temperature".

Col. 6, line 47, delete "(26 in Fig. 9B)".

Col. 6, line 48, delete "(28 in Fig. 9B)".

Col. 6, line 64, insert --of-- before "facing".

Col. 7, line 37, delete "of".

Signed and Sealed this

Sixth Day of May, 1997

Attest:

BRUCE LEHMAN

*Attesting Officer*  *Commissioner of Patents and Trademarks*